No. 46,464. PATENTED FEB. 21, 1865.
W. H. GRANT.
METHOD OF UNITING RUBBER ROLLS TO SHAFTS.
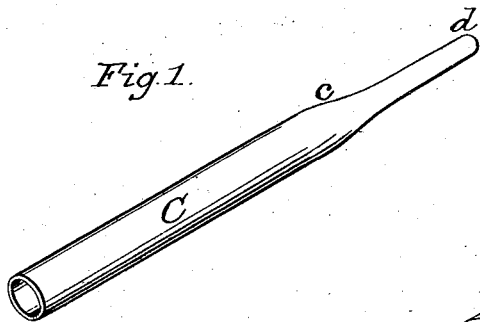
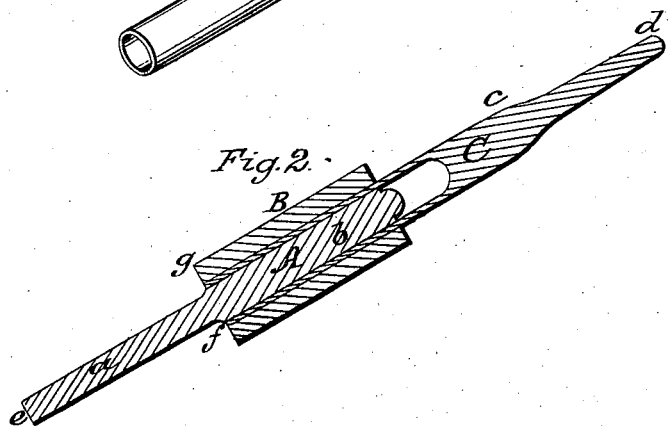
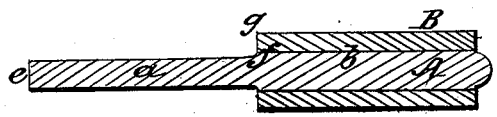
Witnesses.
James E. Weston.
H. H. Weston.
Inventor.
William H. Grant.

UNITED STATES PATENT OFFICE.

WILLIAM H. GRANT, OF WINCHENDON, MASSACHUSETTS.

IMPROVED METHOD OF UNITING RUBBER ROLLS TO SHAFTS.

Specification forming part of Letters Patent No. 46,464, dated February 21, 1865.

*To all to whom it may concern:*

Be it known that I, WILLIAM H. GRANT, of Winchendon, in the county of Worcester and State of Massachusetts, have invented a new and Improved Method of Uniting Rubber Rolls to Shafts; and I hereby declare that the following is a full and exact description thereof, reference being had to the accompanying drawings, making part of this specification, in which—

Figure 1 is a view of the tool which I employ in laying the roll upon its shaft. Fig. 2 is a longitudinal section showing the position of the roll just before the tool is withdrawn. Fig. 3 is a longitudinal section through the shaft and roll after they are united together.

In the ordinary process of connecting rubber rolls with metallic shafts it has been customary to heat the shafts sufficiently to slightly melt the rubber in the interior of the roll to cause it to adhere to the shaft when drawn upon it. After heating, each shaft was removed to a vise, where it was securely held while the roll was being "laid on." This method was slow and laborious, and wringer-rolls so laid on were liable after a little use to turn on their shafts during the operation of wringing clothes.

The object of my invention is to overcome the above-mentioned difficulties; and it consists in melting the rubber in the interior of the roll by drawing it over a heated instrument which surrounds that portion of the shaft on which the roll is to be laid, which instrument, on being withdrawn, leaves the roll in the required position, the shaft being in a cool state when the roll is laid upon it.

To enable others skilled in the art to understand and use my invention, I will proceed to describe the manner in which I have carried it out.

In the said drawings, A is a metal shaft having a portion of its length turned down, as seen at $a$. The portion $b$ of this shaft is of the length of the rubber roll B, to be placed thereon.

C is a hollow metal tube, which is tapered somewhat conically from $c$ to $d$ to allow of the roll B being drawn over it.

The operation of uniting the roll to the shaft will now be described.

The end $e$ of the cool shaft is first secured firmly in a vise, the inclination of the shaft being about forty-five degrees with the bench, and the tube C, having been heated sufficiently to melt the rubber, is seized at $d$ by a pair of tongs and placed over that portion of the shaft on which the roll is to be laid, the lower end of the tube C extending up to the shoulder $f$ of the shaft, as seen in Fig. 2. The hollow rubber roll is now drawn over the tapering end $c\,d$ of the tube C and down upon the shaft A until its end $g$ is even with the shoulder $f$ of the shaft, when the roll being held in place, the tube C is easily withdrawn from under the roll, which leaves the latter in its proper place upon the shaft A, which is now removed from the vise, and another shaft secured as before, ready for the same operation to be repeated, the tube C being employed to lay on a number of rolls before its temperature is reduced so much as to be unable to melt the rubber as required.

By my improved process of laying on the rolls I need only employ two tubes or instruments similar to C, one of which is being heated while the other is in use, and consequently I require a much smaller furnace than is necessary where each shaft is to be heated. By thus melting the interior surface of the roll and laying it upon a cool shaft instead of on a heated shaft, as heretofore, the roll is caused to adhere more firmly to its shaft, and the liability of the roll becoming loose and turning upon it is thereby avoided.

What I claim as my invention, and desire to secure by Letters Patent, is—

The method of uniting rubber rolls to shafts, substantially as set forth.

WILLIAM H. GRANT.

Witnesses:
IRVING E. WESTON,
H. M. WESTON.